(12) United States Patent
Kanno et al.

(10) Patent No.: US 7,435,394 B2
(45) Date of Patent: Oct. 14, 2008

(54) TREATMENT METHOD FOR DECOMPOSING PERFLUOROCOMPOUND, DECOMPOSING CATALYST AND TREATMENT APPARATUS

(75) Inventors: Shuichi Kanno, Hitachi (JP); Shin Tamata, Oarai (JP); Shinichi Ichikawa, Mito (JP); Terufumi Kawasaki, Hitachinaka (JP); Hisao Yamashita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 10/643,946

(22) Filed: Aug. 20, 2003

(65) Prior Publication Data
US 2004/0042948 A1 Mar. 4, 2004

(30) Foreign Application Priority Data
Aug. 28, 2002 (JP) ............................. 2002-247952

(51) Int. Cl.
*B01D 50/00* (2006.01)
(52) U.S. Cl. ...................................... 422/168
(58) Field of Classification Search ................ 422/168, 422/211; 423/241
See application file for complete search history.

(56) References Cited

U.S. PATENT DOCUMENTS 6,468,490 B1 * 10/2002 Shamouilian et al. ....... 423/241

FOREIGN PATENT DOCUMENTS

| EP | 885648 | 12/1998 |
|---|---|---|
| JP | 10-192653 | 7/1998 |
| JP | 11-70322 | 3/1999 |
| JP | 11-244656 | 9/1999 |

* cited by examiner

Primary Examiner—Glenn Caldarola
Assistant Examiner—Tom Duong
(74) Attorney, Agent, or Firm—Mattingly, Stanger Malur & Brundidge, P.C.

(57) ABSTRACT

An object of the present invention is to improve the decomposition at low temperatures of perfluorocompounds containing only fluorine as a halogen, such as $CF_4$, $C_2F_6$ and the like. In the present invention, a perfluorocompound containing only fluorine as a halogen is brought into contact with a catalyst comprising Al, Ni and W as catalytically active ingredients and comprising a mixed oxide or complex oxide of Ni and Al and a mixed oxide or complex oxide of W and Ni, in the presence of steam or a combination of steam and air at a temperature of 500 to 800° C. to convert the fluorine in the perfluorocompound to hydrogen fluoride. Employment of the catalyst of the present invention improves the decomposition at low temperatures and hence makes it possible to decompose the perfluoro-compound at a high percentage of decomposition at a lower temperature.

5 Claims, 7 Drawing Sheets

TREATMENT METHOD FOR DECOMPOSING PERFLUOROCOMPOUND, DECOMPOSING CATALYST AND TREATMENT APPARATUS

BACKGROUND OF THE INVENTION

The present invention relates to a perfluoro-compound treatment method for decomposing a halogen compound containing only fluorine as a halogen, such as $CF_4$ or $C_2F_6$, a catalyst used for the decomposition, a process for preparing the catalyst, and a treatment apparatus.

Compounds containing only fluorine as a halogen are referred to as perfluorocompounds (hereinafter referred to as PFC's) and are used as an etching agent for semiconductors or liquid crystals, a semiconductor cleaning agent, etc. Since PFC's are substances responsible for global warming, various methods for decomposing PFC's are investigated. There are PFC decomposing methods using a catalyst, and JP-A-10-192653, JP-A-11-70322 and JP-A-11-244656 disclose such methods.

SUMMARY OF THE INVENTION

An object of the present invention is to enhance the activity of a catalyst exhibited at low temperatures, in a method for decomposing PFC by the use of the catalyst.

The present invention is directed to the decomposition of PFC using a catalyst containing Ni, Al and W as active ingredients.

The active ingredients of the catalyst of the present invention are contained finally in the form of oxides. At least, a mixed oxide or complex oxide of Ni and Al and a mixed oxide or complex oxide of Ni and W are contained in the catalyst. Oxides of a single element, such as NiO, $WO_3$, $Al_2O_3$ and the like or a mixed oxide or complex oxide of Al and W may also be contained besides the mixed oxide or complex oxide of Ni and Al and the mixed oxide or complex oxide of Ni and W. The term "mixed oxide or complex oxide" is generally referred to as "compound oxide".

It is preferable that the mixed oxide or complex oxide of Ni and Al is composed of or contains a spinel type mixed oxide or complex oxide. The spinel type mixed oxide or complex oxide is preferably composed of $NiAl_2O_4$. It is also preferable that the mixed oxide or complex oxide of Ni and W is composed of or contains $NiWO_4$.

Other objects, features and advantages of the invention will become apparent from the following description of the embodiments of the invention taken in conjunction with the accompanying drawings.

DESCRIPTION OF REFERENCE NUMERALS

1—reactor, 2—catalyst for PFC decomposition, 3—electric furnace, 4—exhaust gas washing tank, 5—mist catcher, 6—drying agent.

DETAILED DESCRIPTION OF THE INVENTION

The active ingredients of the catalyst of the present invention are Ni, Al and W. However, a small amount of ingredients other than these three ingredients may be contained in the catalyst so long as they do not affect the object of the present invention adversely. As to the amounts of the elements as the active ingredients of the enzyme, the mole ratio of Ni to Al is preferably 5/95 to 40/60, in particular, 15/85 to 30/70. The mole ratio of Ni to Al of 5/95 is converted to the following percentages by weight; Ni: 5.6 wt %, and Al: the balance. The mole ratio of Ni to Al of 40/60 is converted to the following percentages by weight; Ni: 38.8 wt %, and Al: the balance. The mole ratio of Ni to Al of 15/85 is converted to the following percentages by weight; Ni: 16.1 wt %, and Al: the balance. The mole ratio of Ni to Al of 30/70 is converted to the following percentages by weight; Ni: 30.3 wt %, and Al: the balance. A high percentage of PFC decomposition can be attained when the ratio of Ni to Al is in the above range. The percentage of PFC decomposition at low temperatures can be increased by adding W in an amount of 0.1 to 10 wt %, preferably 1 to 5 wt %, to a catalyst comprising Ni and Al in the above ratio.

Although the reason why the percentage of PFC decomposition at low temperatures is increased by the addition of W to the catalyst comprising Ni and Al is not clear, it is conjectured that the dissociation and activation of $H_2O$ are facilitated by the addition of W and that W and Ni form a mixed oxide or complex oxide to permit smooth supply of the activated $H_2O$ to PFC on the Ni surface. That is, it can be speculated that W is present as a mixed oxide or complex oxide with Ni in the vicinity of particles of a mixed oxide or complex oxide such as $NiAl_2O_4$ and causes the dissociation and activation of steam to accelerate the decomposition reaction of PFC.

PFC to be decomposed in the present invention is a compound containing only fluorine as a halogen and includes, for example, compounds of carbon and fluorine, compounds of carbon, hydrogen and fluorine, compounds of carbon, fluorine, hydrogen and oxygen, compounds of carbon, fluorine and oxygen, compounds of sulfur and fluorine, compounds of sulfur, fluorine and oxygen, compounds of nitrogen and fluorine, and compounds of nitrogen, fluorine and oxygen. Examples thereof are $CF_4$, $CHF_3$, $CH_2F_2$, $CH_3F$, $C_2F_6$, $C_2HF_5$, $C_2H_2F_4$, $C_2H_3F_3$, $C_2H_4F_2$, $C_2H_5F$, $C_3F_8$, $CH_3OCF_2CF_3$, $C_4F_8$, $C_5F_8$, $SF_6$, $SO_2F_2$, $NF_3$, etc.

It is conjectured that in the PFC decomposing method of the present invention, the decomposition proceeds mainly according to the reaction formulas described below. The decomposition reaction of PFC is a hydrolytic reaction and hydrogen fluoride HF is produced by the decomposition of PFC. Other decomposition products are carbon monoxide, carbon dioxide, nitrogen oxides, sulfur oxides and the like. When carbon monoxide is produced, it can be converted to carbon dioxide in a reactor if sufficient oxygen to decompose carbon monoxide is present in a gas flow, because the catalyst of the present invention has activity to oxidize carbon monoxide.

$$CF_4 + 2H_2O \rightarrow CO_2 + 4HF$$

$$C_2F_6 + 3H_2O \rightarrow CO + CO_2 + 6HF$$

$$CHF_3 + H_2O \rightarrow CO + 3HF$$

$$SF_6 + 3H_2O \rightarrow SO_3 + 6HF$$

$$NF_3 + \tfrac{3}{2}H_2O \rightarrow NO + \tfrac{1}{2}O_2 + 3HF$$

In the present invention, steam is necessary for the decomposition of PFC. For the conversion of PFC to HF, the reaction gas has to contain hydrogen molecules in at least a number corresponding to the number of F atoms in a gas to be treated. Although steam is usually contained in the reaction gas in an amount of tens times the theoretical necessary amount of steam, a high percentage of decomposition can be attained in the present invention even if the amount of steam is reduced, because the activation of steam in the reaction gas is facilitated by the addition of W in the present invention. In the present invention, as the amount of steam, 3 to 20 times the theoretical necessary amount of steam is sufficient, and the amount of steam may be approximately 5 to 10 times the theoretical necessary amount of steam.

The reaction temperature is preferably 500 to 800° C. When the reaction temperature is lower than 500° C., no high percentage of PFC decomposition can be attained even in the present invention. When the reaction temperature is 550° C. or higher, the catalyst of the present invention exhibits a very high activity to decompose PFC. When the concentration of PFC is as high as 3 to 5%, the reaction temperature is preferably rather high. When the concentration of PFC is as low as 1% or less, the reaction temperature may be rather low. Lowering the reaction temperature makes it possible to suppress the deactivation of the catalyst and retard the progress of the corrosion of materials for a treatment apparatus.

In the present invention, a gas discharged from a reactor is preferably brought into contact with water or an alkali in order to remove HF produced by the decomposition reaction of PFC. As a method for bringing the decomposition products of PFC into contact with water or an alkali, there can be adopted, for example, a method of bubbling a gas produced by the decomposition into water or an aqueous alkali solution, and a method of spraying the gas produced by the decomposition with water or an aqueous alkali solution. A method of washing the gas by the use of a packed tower can also be adopted. In addition, an alkaline solid may be used in place of the aqueous alkali solution.

In the preparation of the catalyst of the present invention, as a material for Al, γ-alumina, a mixture of γ-alumina and δ-alumina, and the like can be used. It is very preferable to use, in particular, boehmite as material for Al and form an oxide by final calcination.

As a material for Ni or a material for W, nitrate, sulfate, ammonium salt, chloride and the like can be used.

As a method for producing the catalyst, there can be adopted a precipitation method, impregnation method, kneading method and the like which are usually adopted for producing a catalyst. A method comprising adding an aqueous solution containing a material for nickel to powder of a material for aluminum, calcining the resulting mixture, adding thereto an aqueous solution containing a material for tungsten, and then calcining the resulting mixture to produce a catalyst containing a mixed oxide or complex oxide of Ni and Al and a mixed oxide or complex oxide of Ni and W, is a very preferable method for preparing the catalyst.

As to the final shape of the catalyst, the catalyst may be in the shape of beads or may be formed into a honeycomb shape. As a method for shaping the catalyst, any method such as extrusion, punch-pelletizing, roll palletizing or the like may be adopted. In addition, a product obtained by coating a honeycomb or plate made of ceramics or metal with the catalyst may be used.

The apparatus for treating PFC of the present invention comprises a means for obtaining a gas flow by diluting PFC with nitrogen or air, a means for adding steam to the gas flow, a reactor for bringing the gas flow containing the added steam into contact with a catalyst, a heating means for heating the catalyst in the reactor to the decomposition temperature of the PFC, and an exhaust gas washing tank for removing HF by bringing a gas containing decomposition products produced in the reactor into contact with water or an alkali. It is preferable that an adsorbing means for removing carbon monoxide, nitrogen oxides (e.g. NO and $NO_2$), sulfur oxides (e.g. $SO_2$ and $SO_3$) and the like which have been not neutralized by the washing is set so as to succeed the exhaust gas washing tank.

In practicing the treatment method of the present invention, it is preferable to adjust the concentration of PFC in a gas flow to be treated to at most 5% or less, usually about 1% to about 2%. When the PFC concentration is too high, a piping for flowing of the gas to be treated, a reactor and the like are liable to be deteriorated by corrosion. PFC is preferably diluted with nitrogen or air in order to adjust the PFC concentration to a value in the above range.

The reactor may be of a conventional fixed bed, moving bed or fluidized bed type. Since corrosive gases such as HF are produced by the decomposition, the reactor has to be made of a material that is hardly attacked by these corrosive gases.

When the gas flow to be treated contains a solid or, for example, a component capable of reacting with $H_2O$ in the reactor to produce a solid, the solid or the component is preferably removed previously, for example, by setting a standard solid-removing apparatus such as a wet scrubber so that it may precede the reactor, whereby the solid or the component is prevented from precipitating on the surface of a catalyst and lowering the activity to decompose PFC.

It is preferable to use the PFC decomposing apparatus of the present invention in an etching step in an existing semiconductor factory or liquid crystal factory. Since impurities produced by etching are contained in a PFC-containing gas flow discharged in the etching step and are liable to affect the decomposition of PFC, they are preferably removed before their entrance into the reactor. Since the semiconductor factory is generally equipped with an exhaust gas treatment apparatus for treating an acid component gas, it is also possible to utilize this apparatus as an apparatus for washing the gases produced by the decomposition of PFC and set a reactor packed with the catalyst of the present invention, so that the reactor may precede the apparatus.

DESCRIPTION OF PREFERRED EMBODIMENT

EXAMPLE 1

In Example 1, there are described the results of comparing a catalyst comprising Ni and Al with a catalyst comprising Ni, Al and W, in performance characteristics.

Catalyst 1

The catalyst comprising Ni and Al was prepared as follows.

Commercial boehmite powder (Pural SBI, mfd. by CONDEA Corp.) was dried at 120° C. for 1 hour. With 200.88 g of the dried powder was kneaded an aqueous solution containing 210.86 g of nickel nitrate hexahydrate (Wako Pure Chemical Industries, Ltd.). After the kneading, the kneaded product was dried at about 300° C. for about 2 hours and then calcined at 700° C. for 2 hours. The calcined product was ground and then sieved to have a particle size of 0.5 to 1 mm. The composition of the catalyst thus completed was such that the mole ratio of Ni to Al was 20/80. As a result of investigating X-ray diffraction pattern of the catalyst, the presence of peaks due to $NiAl_2O_4$ and NiO were confirmed, namely, it was confirmed that the catalyst contained these oxides. Since no peak due to $Al_2O_3$ was detected, it was conjectured that $Al_2O_3$ was contained in an amorphous state in the catalyst.

Catalyst 2

The catalyst comprising Ni, Al and W was prepared as follows. As to the amount of W, the amount of W charged was 5 wt % (in terms of metal) based on the total weight of the catalyst comprising a mixed oxide or complex oxide of Ni and Al.

The catalyst comprising Ni and Al (hereinafter referred to as the Ni/Al catalyst) prepared as catalyst 1 was dried at 120° C. for 1 hour. Then, 100.31 g of the dried Ni/Al catalyst was impregnated with an aqueous solution prepared by dissolving 7.10 g of ammonium tungstate para-pentahydrate (approx. $(NH_4)_{10}W_{12}O_{41}\cdot5H_2O$, Wako Pure Chemical Industries, Ltd.) in 48.31 g of a 30% aqueous hydrogen peroxide solution (Wako Pure Chemical Industries, Ltd.). After the impregnation, the catalyst was dried at 120° C. for 2 hours and then calcined at 750° C. for 2 hours. It was confirmed by X-ray diffraction pattern that $NiAl_2O_4$ and NiO were present in the catalyst thus obtained and that $Al_2O_3$ was contained therein in an amorphous state. In addition, the presence of $NiWO_4$ was confirmed by XPS analysis chart. By the XPS analysis chart, the presence of an oxide which seemed to be $WO_3$ or $Al_2(WO_4)_3$ was also confirmed.

Figure 1:
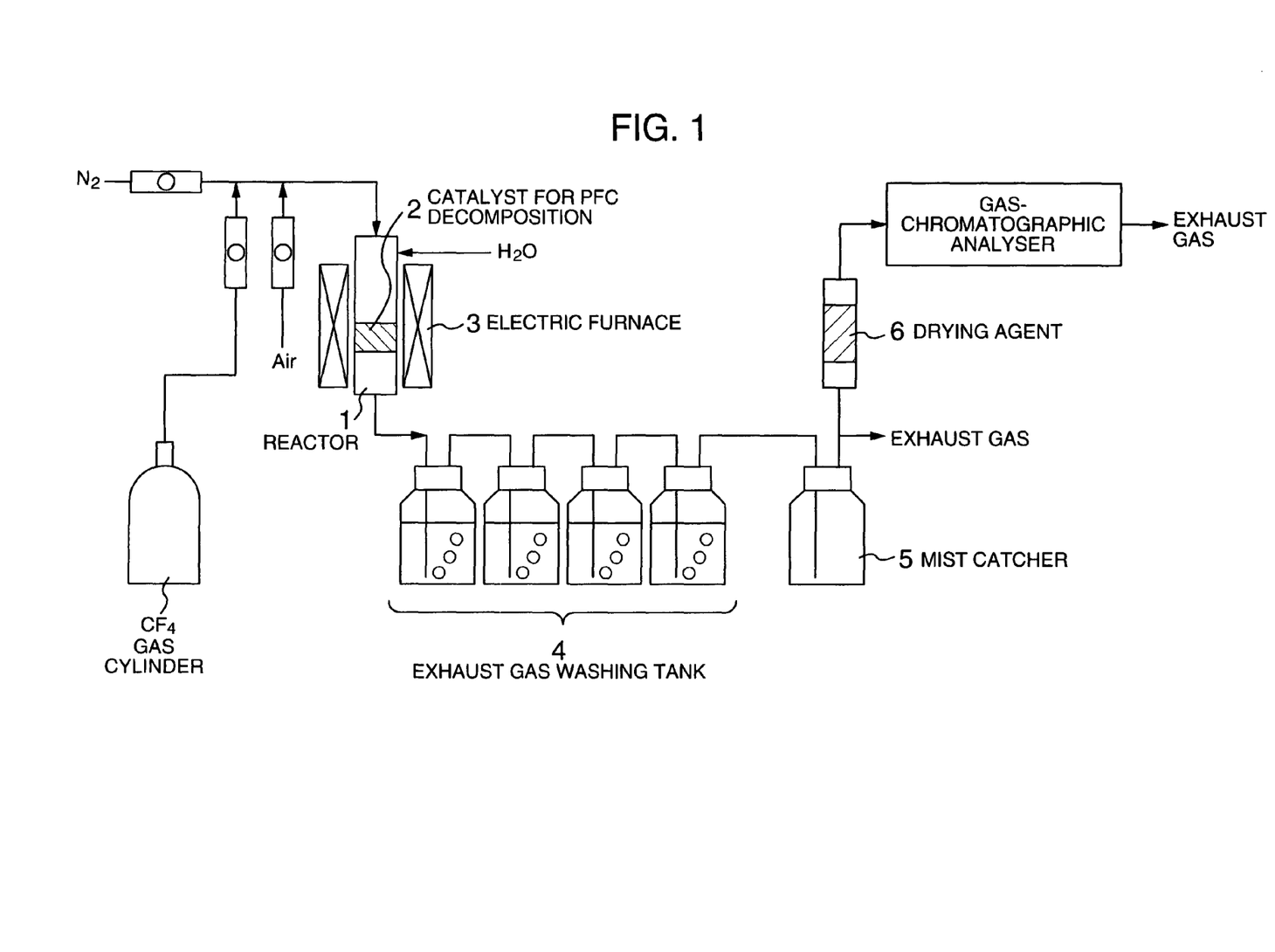
FIG. 1 is a schematic illustration showing one embodiment of the treatment apparatus of the present invention.

FIG. 1 shows a flow sheet for a lab-scale small treatment apparatus used in Example 1. This apparatus comprises supply lines for $N_2$, air, $CF_4$ and $H_2O$, a reactor 1, an exhaust gas washing tank 4 and a mist catcher 5. As the reactor 1, a reactor with an inside diameter of 32.5 mm, an outside diameter of 38.0 mm and a length of 450.0 mm was used. This reactor had therein a thermocouple protecting tube with an outside diameter of 3 mm made of Inconel. The reactor 1 is packed with the catalyst for PFC decomposition 2 of the present invention. The space not packed with the catalyst for PFC decomposition in the upper part of the reactor is a preheating layer. The reactor 1 is set inside an electric furnace 3. The electric furnace performs a function of heating the catalyst for PFC decomposition 2 and a function of preheating a gas flow containing PFC.

Nitrogen at a flow rate of about 743 ml/min, air at a flow rate of about 187 ml/min and $CF_4$ at a flow rate of about 4.44 ml/min were mixed before their arrival at the reactor 1 and then introduced into the reactor 1. The $CF_4$ concentration (calculated from the flow rates of nitrogen, air and $CF_4$) as a dry basis percentage was about 0.43%. The space velocity (SV) was 920 to 925 $h^{-1}$. As $H_2O$, pure water was supplied to the reactor from above at a rate of about 0.180 ml/min and evaporated in the preheating layer. The reactor was made of Inconel 600 and was packed with about 75 ml of the catalyst for PFC decomposition 2.

The reactor 1 was heated from the outside with the electric furnace 3 to adjust the temperature of the catalyst to a predetermined temperature. The gas produced by the decomposition was introduced into the exhaust gas washing tank 4 containing tap water, to remove acidic components such as HF by absorption. The mist catcher 5 was set so as to succeed the exhaust gas washing tank. The gas passed through the mist catcher was further passed through a container packed with a drying agent 6, to be thoroughly freed of water. Thereafter, the concentration of $CF_4$ in the gas thus treated was measured with a TCD gas-chromatographic analyzer. The percentage of decomposition of $CF_4$ was calculated by the following equation:

$$\text{Percentage of decomposition} = \left(1 - \frac{CF_4 \text{ concentration at outlet(dry basis)}}{CF_4 \text{ concentration at inlet(dry basis)}}\right) \times 100(\%) \quad \text{(expression 2)}$$

Figure 2:
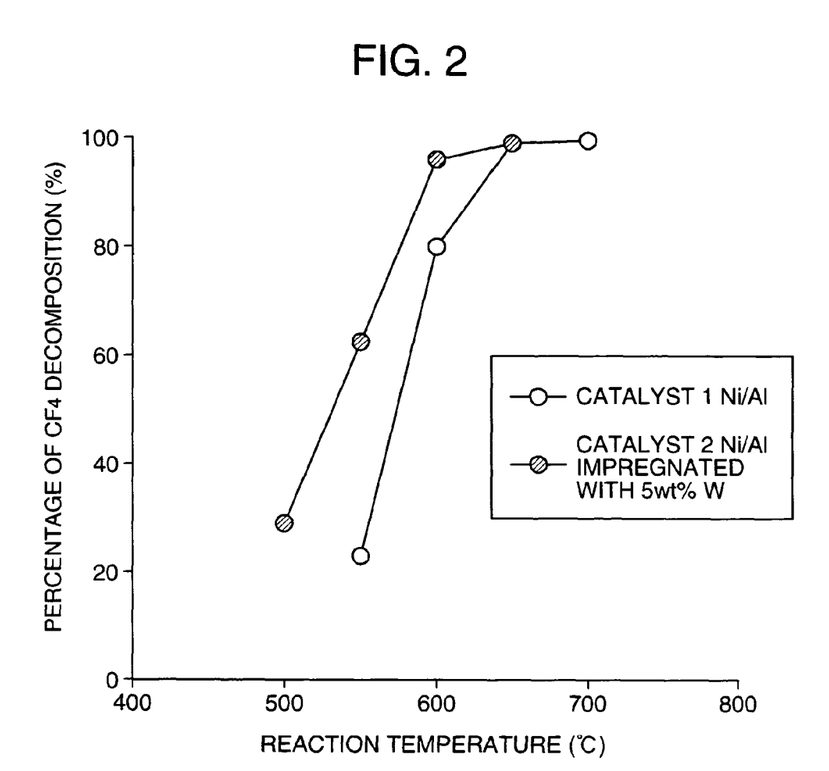
FIG. 2 is a graph showing a relationship between the percentage of $CF_4$ decomposition and reaction temperature.

FIG. 2 shows the results of evaluation of performance characteristics. The percentage of $CF_4$ decomposition in the case of catalyst 1 composed of the Ni/Al catalyst was 80% at 604° C. On the other hand, the percentage of $CF_4$ decomposition in the case of catalyst 2 obtained by adding W to the Ni/Al catalyst was as very high as 96% at 603° C. As is obvious from FIG. 2, catalyst 2 gives a higher percentage of decomposition at low temperatures than does catalyst 1, namely, catalyst 2 is superior to catalyst 1 in decomposing activity at low temperatures. The percentage of decomposition attained at 500° C. in the case of catalyst 2 is higher than the percentage of decomposition attained at 600° C. in the case of catalyst 1. It is conjectured that the reason why catalyst 2 is superior to catalyst 1 in decomposing activity is, for example, that the addition of W dissociates and activates steam to accelerate the decomposition reaction of PFC, and that the aqueous hydrogen peroxide solution used for preparing the catalyst contributes to a pore diameter change.

EXAMPLE 2

In Example 2, the percentage of decomposition was measured for the same catalysts as catalyst 2 described in Example 1, except that the W content was varied.

Catalyst 3

A catalyst comprising Ni, Al and W was prepared by the following method by adding W so that the amount of W charged might be 1 wt % (in terms of metal) based on the total weight of the catalyst comprising a mixed oxide or complex oxide of Ni and Al.

The Ni/Al catalyst prepared as catalyst 1 was dried at 120° C. for 1 hour. Then, 100.84 g of the dried Ni/Al catalyst was impregnated with an aqueous solution prepared by dissolving 1.42 g of ammonium tungstate para-pentahydrate (approx. $(NH_4)_{10}W_{12}O_{41}\cdot5H_2O$ Wako Pure Chemical Industries, Ltd.) in 48.33 g of a 30% aqueous hydrogen peroxide solution (Wako Pure Chemical Industries, Ltd.). After the impregnation, the catalyst was dried at 120° C. for 2 hours and then calcined at 750° C. for 2 hours.

Catalyst 4

A catalyst comprising Ni, Al and W was prepared by the following method by adding W so that the amount of W charged might be 2 wt % (in terms of metal) based on the total weight of the catalyst comprising a mixed oxide or complex oxide of Ni and Al.

The Ni/Al catalyst prepared as catalyst 1 was dried at 120° C. for 1 hour. Then, 100.08 g of the dried Ni/Al catalyst was impregnated with an aqueous solution prepared by dissolving 2.842 g of ammonium tungstate para-pentahydrate (approx. $(NH_4)_{10}W_{12}O_{41}\cdot5H_2O$ Wako Pure Chemical Industries, Ltd.) in 48.40 g of a 30% aqueous hydrogen peroxide solution (Wako Pure Chemical Industries, Ltd.). After the impregnation, the catalyst was dried at 120° C. for 2 hours and then calcined at 750° C. for 2 hours.

Figure 6:
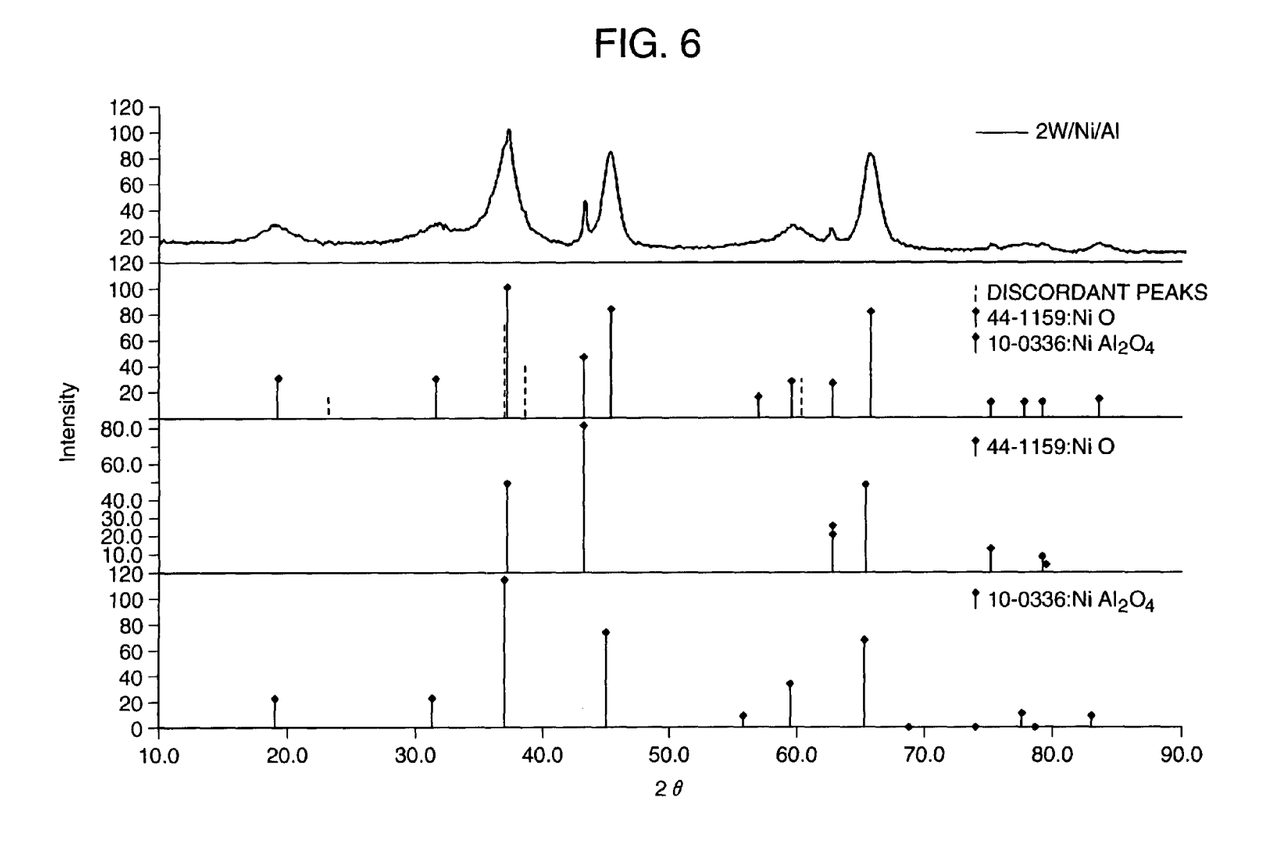
FIG. 6 is a graph showing an X-ray diffraction pattern of the catalyst of the present invention.
Figure 7:
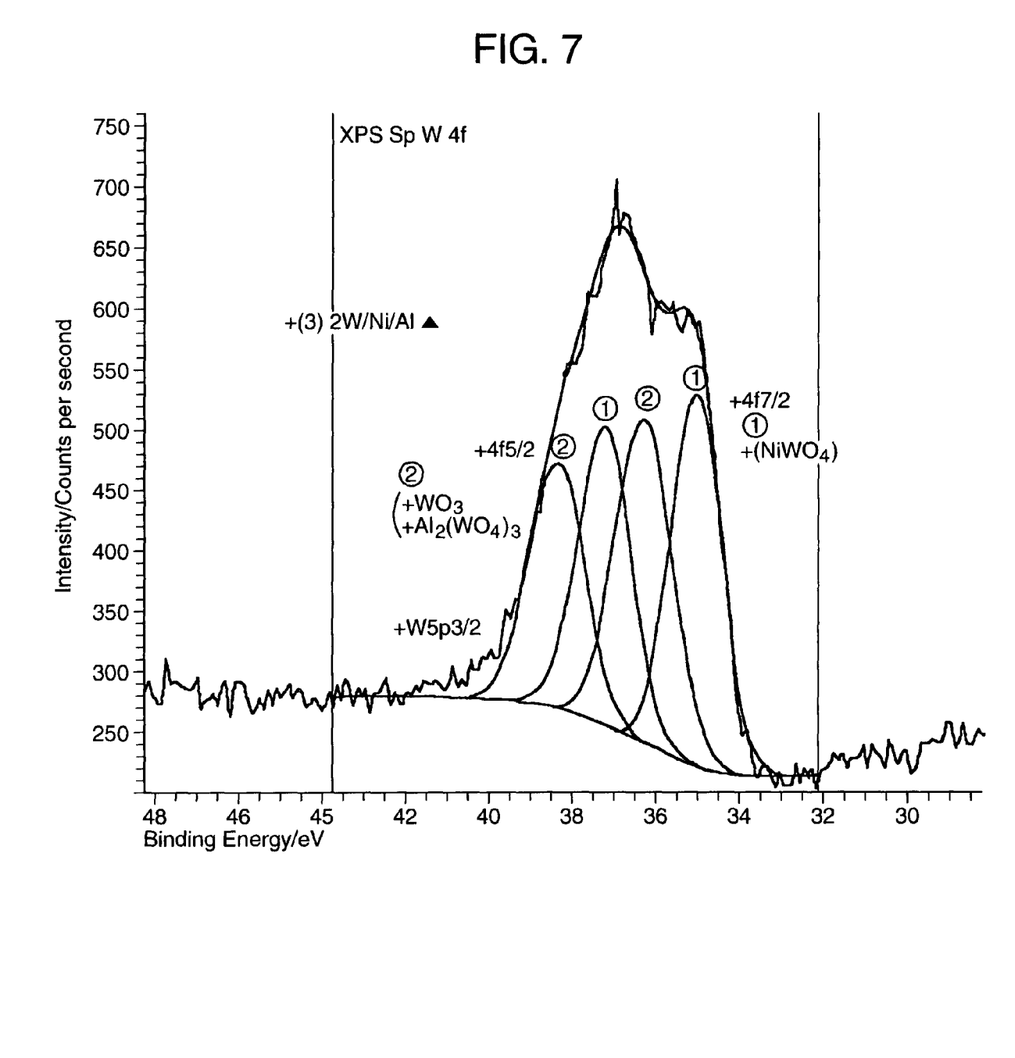
FIG. 7 is a graph showing an XPS analysis chart of the catalyst of the present invention.

FIG. 6 shows an X-ray diffraction pattern of the catalyst thus obtained. Peaks due to $NiAl_2O_4$ and NiO were detected, namely, it was clear that these oxides were contained in this catalyst. Since no peak due to $Al_2O_3$ was detected, it was conjectured that $Al_2O_3$ was contained in an amorphous state in the catalyst. FIG. 7 shows an XPS analysis chart. The presence of $NiWO_4$ was confirmed. The presence of an oxide which seemed to be $WO_3$ or $Al_2(WO_4)_3$ was also confirmed.

Catalyst 5

A catalyst comprising Ni, Al and W was prepared as follows by adding W so that the amount of W charged might be 3 wt % (in terms of metal) based on the total weight of the catalyst comprising a mixed oxide or complex oxide of Ni and Al.

The Ni/Al catalyst prepared as catalyst 1 was dried at 120° C. for 1 hour. Then, 100.68 g of the dried Ni/Al catalyst was impregnated with an aqueous solution prepared by dissolving 4.255 g of ammonium tungstate para-pentahydrate (approx. $(NH_4)_{10}W_{12}O_{41} \cdot 5H_2O$, Wako Pure Chemical Industries, Ltd.) in 48.40 g of a 30% aqueous hydrogen peroxide solution (Wako Pure Chemical Industries, Ltd.). After the impregnation, the catalyst was dried at 120° C. for 2 hours and then calcined at 750° C. for 2 hours.

Catalyst 6

A catalyst comprising Ni, Al and W was prepared as follows by adding W so that the amount of W charged might be 10 wt % (in terms of metal) based on the total weight of the catalyst comprising a mixed oxide or complex oxide of Ni and Al.

The Ni/Al catalyst prepared as catalyst 1 was dried at 120° C. for 1 hour. Then, 100.42 g of the dried Ni/Al catalyst was impregnated with an aqueous solution prepared by dissolving 14.20 g of ammonium tungstate para-pentahydrate (approx. $(NH_4)_{10}W_{12}O_{41} \cdot 5H_2O$, Wako Pure Chemical Industries, Ltd.) in 48.98 g of a 30% aqueous hydrogen peroxide solution (Wako Pure Chemical Industries, Ltd.). After the impregnation, the catalyst was dried at 120° C. for 2 hours and then calcined at 750° C. for 2 hours.

Figure 3:
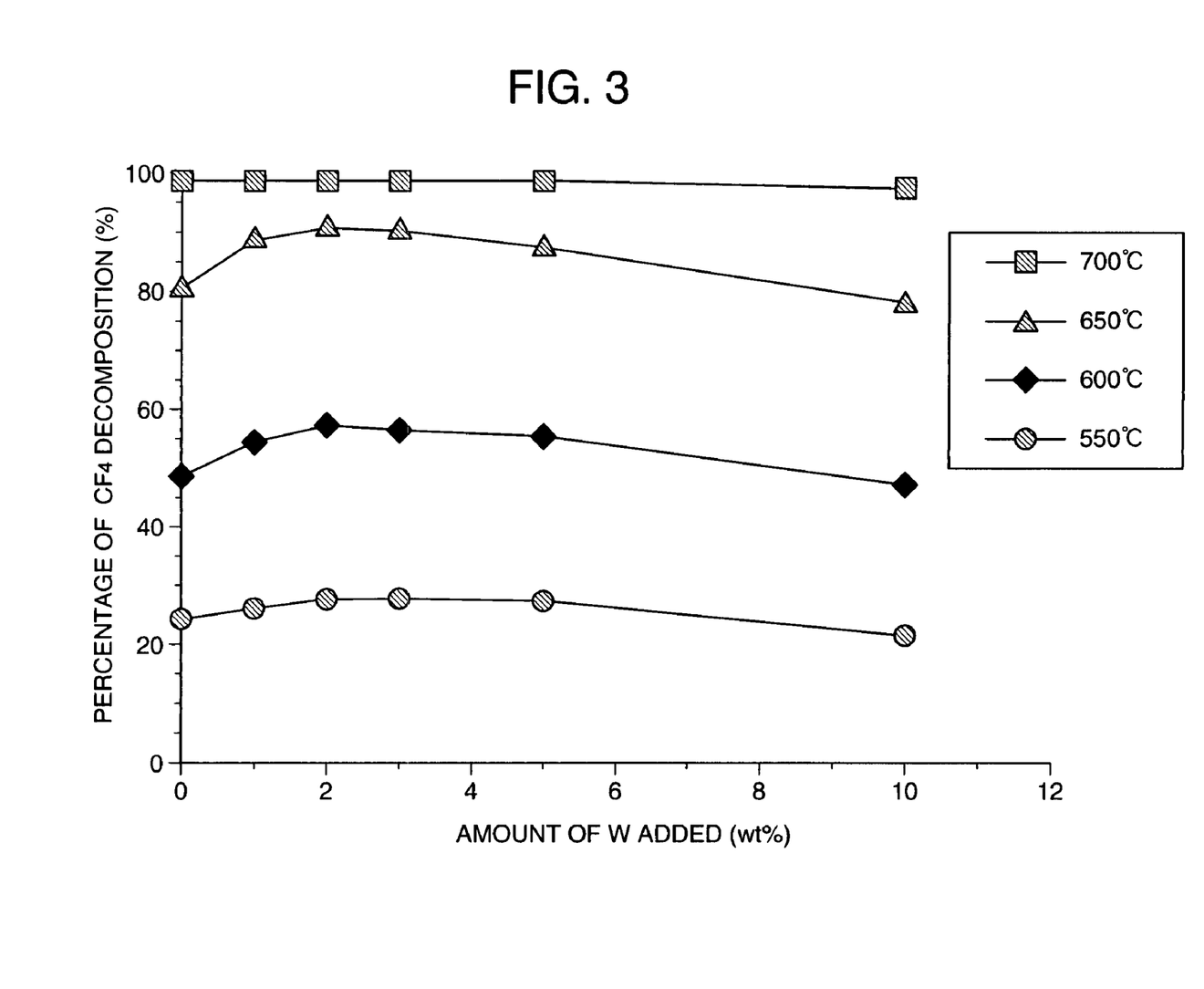
FIG. 3 is a graph showing the relationship between the percentage of $CF_4$ decomposition and the amount of W.

The activity to decompose $CF_4$ was evaluated for catalysts 1 and 2 described in Example 1 and catalysts 3, 4, 5 and 6 by the same method as described in Example 1. FIG. 3 shows the results obtained.

All of the catalysts prepared by adding W to the Ni/Al catalyst in a proportion of 1 to 5 wt % in terms of metal gave higher percentages of decomposition at reaction temperatures of 650° C., 600° C. and 550° C. than did the Ni/Al catalyst, namely, it was confirmed that they are superior to the Ni/Al catalyst in activity at low temperatures. The catalyst prepared by incorporating W into the Ni/Al catalyst in a proportion of 10 wt % in terms of metal was substantially equal to the Ni/Al catalyst in decomposing activity at a reaction temperature of 550° C. to 700° C.

EXAMPLE 3

In Example 3, catalyst 7 and catalyst 8 were prepared by the following methods by using other materials for W, respectively, and their activity to decompose $CF_4$ was investigated. In both cases, as to the amount of W, the amount of W charged was 2 wt % (in terms of metal) based on the total weight of the catalyst comprising a mixed oxide or complex oxide of Ni and Al.

Figure 4:
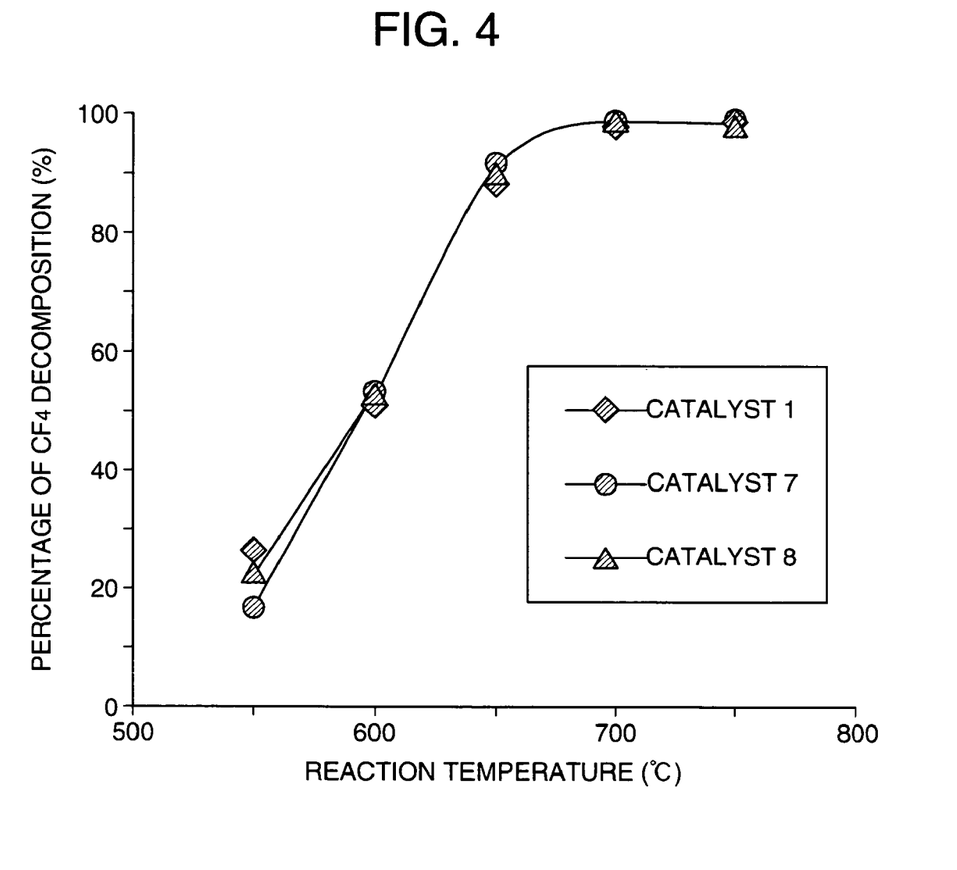
FIG. 4 is a graph showing a relationship between the percentage of $CF_4$ decomposition and reaction temperature.

A test was carried out under the following conditions: $CF_4$ concentration at the inlet of a catalyst layer: 0.8%, the amount of $H_2O$: 10 to 13 times of equivalent ratio, $O_2$ concentration: 1.0 to 1.2%, $N_2$ concentration: the balance, and SV: about 1350 $h^{-1}$. FIG. 4 shows the relationship between the reaction temperature and the percentage of decomposition. When the other materials for W and other solvents were used, substantially the same decomposing capability as that of the Ni/Al catalyst was attained.

Catalyst 7

The Ni/Al catalyst prepared as catalyst 1 was dried at 120° C. for 1 hour. Then, 100.20 g of the dried Ni/Al catalyst was impregnated with an aqueous solution prepared by mixing 2.792 g of a metatungstic acid solution (MW-2, mfd. by Nippon Inorganic Color & Chemical Co., Ltd.) with 41 g of pure water. After the impregnation, the catalyst was dried at 120° C. for 2 hours and then calcined at 700° C. for 2 hours.

Catalyst 8

The Ni/Al catalyst prepared as catalyst 1 was dried at 120° C. for 1 hour. Then, 100.56 g of the dried Ni/Al catalyst was impregnated with an aqueous solution prepared by dissolving 2.851 g of tungstophosphoric acid (Wako Pure Chemical Industries, Ltd.) in 41 g of pure water. After the impregnation, the catalyst was dried at 120° C. for 2 hours and then calcined at 700° C. for 2 hours.

EXAMPLE 4

In Example 4, the influence of the amount of $H_2O$ on the $C_2F_6$ decomposition reaction using catalyst 4 was investigated. For comparison, the performance characteristics of catalyst 1 were also evaluated.

A theoretical formula that represents the $C_2F_6$ decomposition reaction is as shown below, and indicates that $H_2O$ is needed in an amount of three times the number of moles of $C_2F_6$.

$$C_2F_6 + 3H_2O \rightarrow CO + CO_2 + 6HF$$

Figure 5:
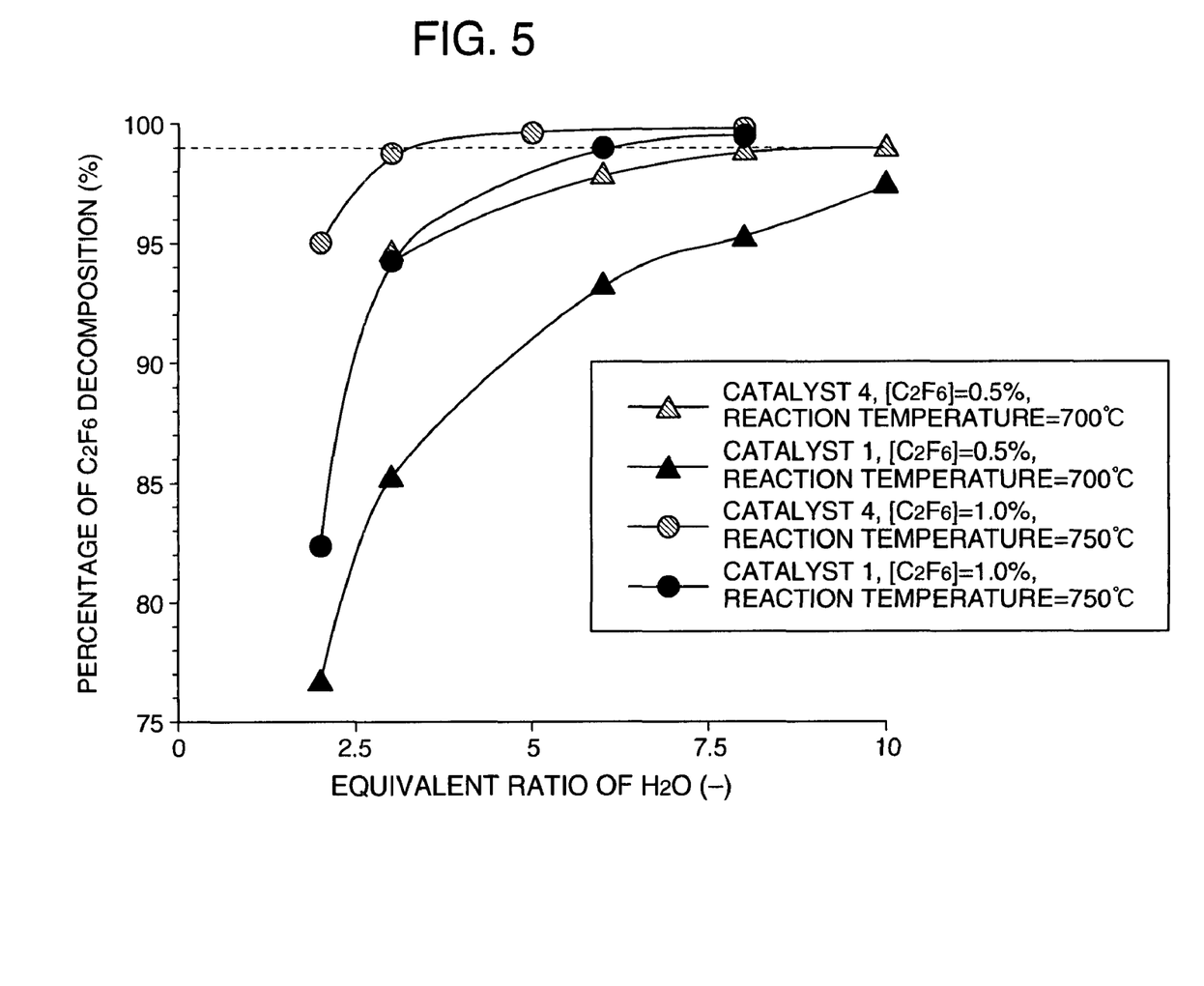
FIG. 5 is a graph showing the relationship between the percentage of $C_2F_6$ decomposition and the equivalent ratio of $H_2O$.

FIG. 5 shows the relationship between the equivalent ratio of $H_2O$ and the percentage of $C_2F_6$ decomposition. In FIG. 5, the data shown by the open or closed circles are those obtained under the following conditions: $C_2F_6$ concentration at the inlet of a catalyst layer: 1.0%, $O_2$ concentration: 1.0 to 1.2%, $N_2$ concentration: the balance, space velocity SV: 1100 to 1400 $h^{-1}$, and reaction temperature: 750° C. The data shown by the open or closed triangles are those obtained under the following conditions: $C_2F_6$ concentration at the inlet of a catalyst layer: 0.5%, $O_2$ concentration: 1.0 to 1.2%, $N_2$ concentration: the balance, space velocity SV: 1100 to 1400 $h^{-1}$, and reaction temperature: 700° C.

Under both the former and latter test conditions, when the equivalent ratio of $H_2O$ is the same, the catalyst comprising Ni, Al and W gives a higher percentage of $C_2F_6$ decomposition than does the catalyst comprising Ni and Al. By this fact, it has been confirmed that the amount of reaction water can be reduced by using the catalyst of the present invention.

According to the present invention, the decomposition at low temperatures of perfluorocompounds containing only fluorine as a halogen, such as $CF_4$, $C_2F_6$ and the like can be improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An apparatus for treating a perfluorocompound comprising a means for obtaining a gas flow by diluting a perfluorocompound with nitrogen or air;
a means for adding steam to said gas flow;
a reactor for bringing said gas flow containing the added steam into contact with a catalyst to decompose the perfluorocompound;
a heating means for heating said catalyst comprising Ni, Al and W as catalytically active ingredients and comprising a composite oxide of Ni and Al and a composite oxide of Ni and W which has been packed in said reactor, to the decomposition temperature of the perfluorocompound;
an exhaust gas washing tank for bringing a gas containing decomposition products produced in said reactor into contact with water or an alkali to remove hydrogen fluoride from the gas, wherein
a mole number of W is less than a mole number of Ni, and the mole number of Ni is less than a mole number of Al; and
said catalyst contains W in a proportion of 1 to 5 wt % based on a total weight of said catalyst comprising a composite oxide of Ni and Al.

2. An apparatus for treating an etching gas wherein an apparatus for treating a perfluorocompound according to claim 1 is set so as to succeed an etching apparatus for a semiconductor or liquid crystal, whereby the etching gas is treated.

3. An apparatus according to claim 2, wherein said catalyst comprises Ni and Al in a mole ratio of 5/95 to 40/60.

4. An apparatus according to claim 1, wherein said catalyst comprises Ni and Al in a mole ratio of 5/95 to 40/60.

5. An apparatus according to claim 1, wherein said catalyst is produced by preparing the composite oxide of Ni and Al, and subsequently impregnating the composite oxide with a W compound.

* * * * *